United States Patent
Fukuma et al.

(10) Patent No.: US 9,437,886 B2
(45) Date of Patent: Sep. 6, 2016

(54) FUEL CELL SYSTEM AND METHOD FOR STOPPING POWER GENERATION IN FUEL CELL SYSTEM

(75) Inventors: Kazunori Fukuma, Tochigi-ken (JP); Nobutaka Nakajima, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 1154 days.

(21) Appl. No.: 13/440,673

(22) Filed: Apr. 5, 2012

(65) Prior Publication Data

US 2012/0258375 A1    Oct. 11, 2012

(30) Foreign Application Priority Data

Apr. 8, 2011  (JP) .................. 2011-086128

(51) Int. Cl.
  *H01M 8/04*   (2016.01)
  *H01M 8/06*   (2016.01)
  *H01M 8/10*   (2016.01)

(52) U.S. Cl.
  CPC ..... *H01M 8/04201* (2013.01); *H01M 8/04089* (2013.01); *H01M 8/04126* (2013.01); *H01M 8/04223* (2013.01); *H01M 8/04111* (2013.01); *H01M 2008/1095* (2013.01); *Y02E 60/50* (2013.01)

(58) Field of Classification Search
  None
  See application file for complete search history.

(56) References Cited

U.S. PATENT DOCUMENTS

| | | | |
|---|---|---|---|
| 6,312,843 B1 * | 11/2001 | Kimbara et al. | 429/444 |
| 2010/0136440 A1 | 6/2010 | Hashimoto et al. | |
| 2010/0151337 A1 * | 6/2010 | Kanazawa | 429/413 |
| 2010/0167152 A1 | 7/2010 | Hocho et al. | |
| 2010/0248045 A1 | 9/2010 | Sakai et al. | |

FOREIGN PATENT DOCUMENTS

| | | |
|---|---|---|
| CN | 2624416 Y | 7/2004 |
| CN | 1612397 A | 5/2005 |
| CN | 101233643 A | 7/2008 |
| CN | 101730955 A | 6/2010 |
| CN | 101874323 A | 10/2010 |
| JP | 2003-115317 A | 4/2003 |
| JP | 2005-268117 A | 9/2005 |
| JP | 2006185904 A | 7/2006 |
| JP | 2008243764 A | 10/2008 |
| JP | 2010027443 A | 2/2010 |
| JP | 2010055816 A | 3/2010 |

OTHER PUBLICATIONS

JP Office Action for JP Application No. 2011-086128 dated Apr. 2, 2013.
The First Office Action dated Feb. 8, 2014 corresponding to Chinese Patent Application No. 201210099867.8 and English translation thereof.

* cited by examiner

*Primary Examiner* — Ladan Mohaddes
(74) *Attorney, Agent, or Firm* — Squire Patton Boggs (US) LLP (57) ABSTRACT

An oxygen-containing gas supply device of a fuel cell system is equipped with an oxygen-containing gas supply flow passage that communicates with an oxygen-containing gas inlet of a fuel cell. An oxygen-containing gas discharge flow passage communicates with an oxygen-containing gas outlet of the fuel cell. A compressor is disposed in the oxygen-containing gas supply flow passage and a supply flow passage sealing valve is disposed downstream from the compressor in the oxygen-containing gas supply flow passage. A discharge flow passage sealing valve is disposed in the oxygen-containing gas discharge flow passage, and a discharge fluid circulation flow passage that communicates with the oxygen-containing gas discharge flow passage is disposed at a location upstream from the discharge flow passage sealing valve, while also communicating with the oxygen-containing gas supply flow passage at a location upstream from the compressor.

7 Claims, 7 Drawing Sheets

FIG. 1

FIG. 2
10a (COMPARATIVE EXAMPLE 1)

FUEL CELL SYSTEM AND METHOD FOR STOPPING POWER GENERATION IN FUEL CELL SYSTEM

CROSS-REFERENCE TO RELATED APPLICATION

This application is based upon and claims the benefit of priority from Japanese Patent Application No. 2011-086128 filed on Apr. 8, 2011, of which the contents are incorporated herein by reference.

BACKGROUND OF THE INVENTION

1. Field of the Invention

The present invention relates to a fuel cell system equipped with a fuel cell that generates electric power through an electrochemical reaction between an oxygen-containing gas, which is supplied to a cathode, and a fuel gas, which is supplied to an anode, an oxygen-containing gas supply device for supplying the oxygen-containing gas to the fuel cell, and a fuel gas supply device for supplying the fuel gas to the fuel cell. The present invention further relates to method for stopping power generation in such a fuel cell system.

2. Description of the Related Art

For example, a solid polymer electrolyte fuel cell incorporates a membrane electrode assembly (electrolyte electrode assembly) (MEA) including an anode and a cathode disposed on respective both sides of an electrolyte membrane made up from a polymer ion exchange membrane, and a pair of separators between which the membrane electrode assembly is sandwiched. A fuel gas flow field for supplying a fuel gas to the anode is formed between one of the separators and the membrane electrode assembly, and an oxygen-containing gas flow field for supplying an oxygen-containing gas to the cathode is formed between the other of the separators and the membrane electrode assembly.

Normally, a plurality of such fuel cells are stacked to form a fuel cell stack. The fuel cell stack is incorporated in a fuel cell electric vehicle in association with various auxiliary devices such as an oxygen-containing gas supply device, a fuel gas supply device, and a coolant supply device, etc., thereby to form a vehicular fuel cell system.

In such a fuel cell system, as noted above, a solid polymer electrolyte membrane is used. In the solid polymer electrolyte membrane, it is necessary to retain a suitable amount of moisture for the purpose of assuring favorable ion conductivity. For this reason, by humidifying beforehand the oxygen-containing gas supplied to the cathode side of the fuel cell, or the fuel gas supplied to the anode side of the fuel cell, drying-out of the solid polymer electrolyte membrane is prevented and a desired humidified state of the solid polymer electrolyte membrane is maintained.

Figure 6:
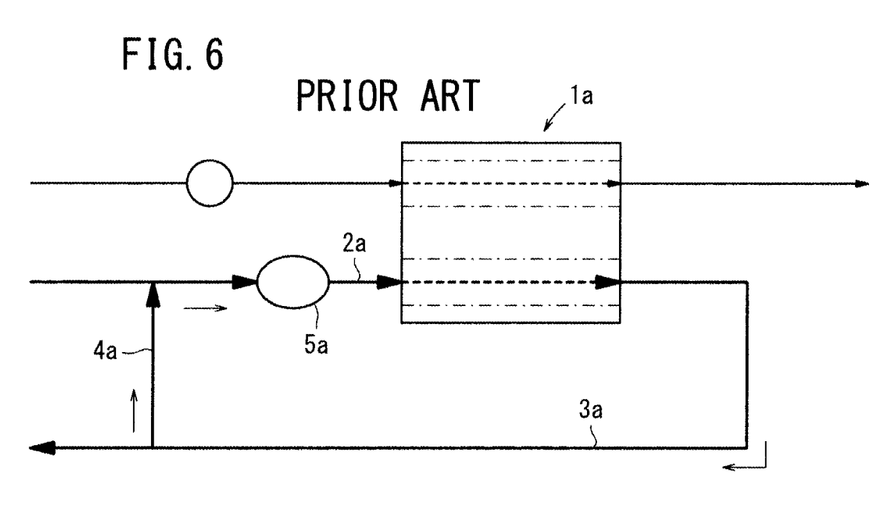
FIG. 6 is a schematic block diagram of a fuel cell power generation system disclosed by conventional technique 1.

For example, in the fuel cell power generation system disclosed in Japanese Laid-Open Patent Publication No. 2005-268117 (hereinafter referred to as "conventional technique 1"), as shown in FIG. 6, there are provided a supply passage 2a that supplies an oxygen-containing gas to a fuel cell 1a, a discharge passage 3a in which an oxygen-containing off gas flows, which is discharged from an oxidant electrode of the fuel cell 1a, and an off gas return passage 4a that communicates between the supply passage 2a and the discharge passage 3a, and which returns at least a portion of the humid oxygen-containing off gas discharged from the fuel cell 1a back to the supply passage 2a.

In the supply passage 2a, a rotational oxygen-containing off gas conveyance drive source 5a is installed at a location downstream from a region where the supply passage 2a and the off gas return passage 4a merge. Owing thereto, the pre-reaction oxygen-containing gas supplied to the fuel cell 1a is humidified by the post-reaction humid oxygen-containing off gas, and therefore a dedicated humidifying device (humidifier) can be dispensed with.

Furthermore, after the pre-reaction oxygen-containing gas and the post-reaction oxygen-containing off gas have been combined to result in a combined fluid, since the oxygen-containing off gas is passed through the oxygen-containing off gas conveyance drive source 5a, the combined fluid is positively mixed, so that diffusive mixing thereof can be enhanced.

On the other hand, with the above fuel cell system, water is generated during power generation, and when power generation is stopped, it is easy for such generated water to be retained on a downstream side from the oxygen-containing gas flow field and the fuel gas flow field. Additionally, at a time that the fuel cell is stopped, if scavenging by air is carried out in the oxygen-containing gas flow field and the fuel gas flow field, when the fuel cell is restarted, deterioration of the cathode is induced, in particular, due to a high potential on the downstream side of the oxygen-containing gas flow field.

Figure 7:
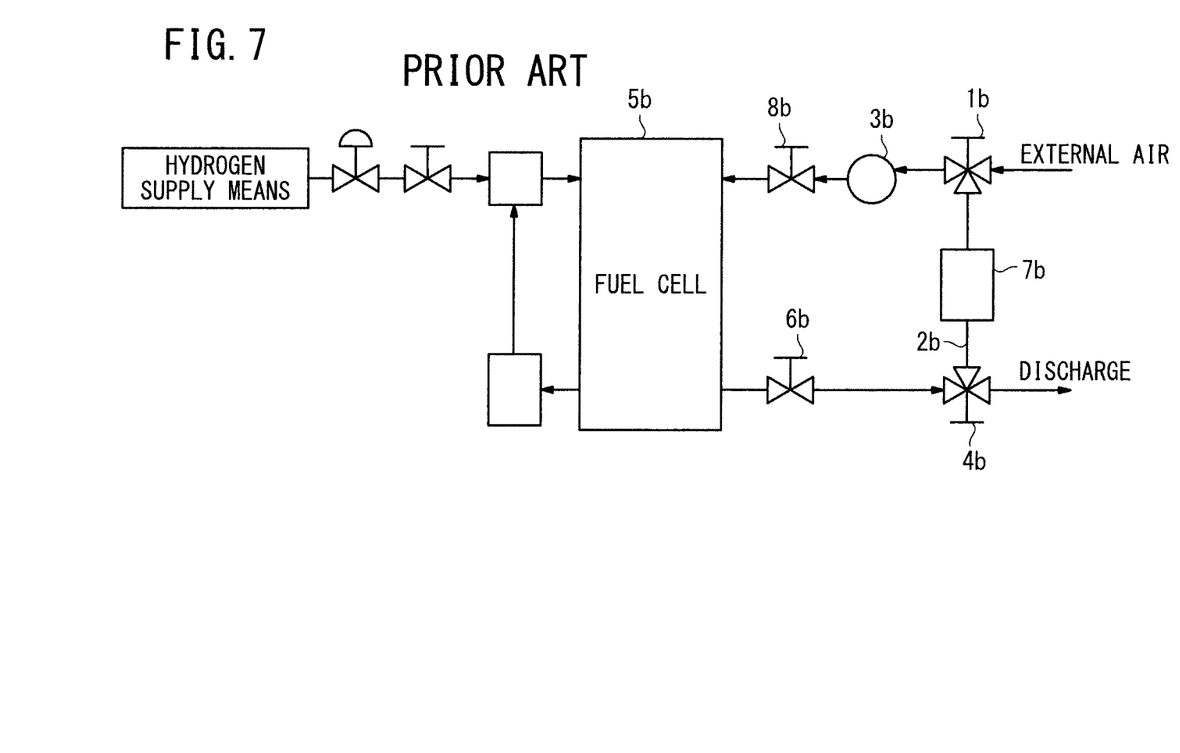
FIG. 7 is an explanatory diagram of a method for stopping power generation disclosed by conventional technique 2.

Thus, a method for stopping power generation of the fuel cell is known, as disclosed, for example in Japanese Laid-Open Patent Publication No. 2003-115317 (hereinafter referred to as "conventional technique 2"). With such a method, as shown in FIG. 7, the open/closed state of a first flow passage switching valve 1b is opened so as to connect an air circulation passage 2b and an air compressor 3b, and to block access to the air inflow side. Further, the open/closed state of a second flow passage switching valve 4b is opened to allow an air off gas, which is discharged from a fuel cell 5b, to flow through the air circulation passage 2b, and to block access to a side where the air off gas is released to atmosphere.

For this reason, in the fuel cell 5b, new outside air is not supplied, and the air off gas, which is discharged from the cathode of the fuel cell 5b, is circulated in a closed circuit from the fuel cell 5b, a second air shutoff valve 6b, the second flow passage switching valve 4b, a dehumidifier 7b, the first flow passage switching valve 1b, the air compressor 3b, a first air shutoff valve 8b, and then back to the fuel cell 5b.

Consequently, oxygen contained in the air off gas is consumed, and the oxygen concentration within the air off gas is reduced. Accordingly, after power generation is stopped, even if cross leakage occurs, almost no reaction takes place between hydrogen and oxygen, and the solid polymer electrolyte membrane can be protected.

SUMMARY OF THE INVENTION

Incidentally, in such a fuel cell system, in addition to controlling membrane humidification and control of stoichiometry (conventional technique 1) in operation, it is desirable to provide a function (conventional technique 2) to seal the cathode system. In particular, as well as sealing the cathode system after power generation has been stopped, it is preferable to carry out oxygen consumption and nitrogen-enrichment while the oxygen-containing gas is circulated within the cathode system. However, in the aforementioned conventional techniques 1 and 2, this type of demand cannot be handled.

The present invention has been made in order to solve the aforementioned problems, and an object of the present invention is to provide a fuel cell system and a method for stopping power generation in a fuel cell system, which with a simple and compact structure, is capable of reducing a cathode side sealing region and suppressing deterioration thereof due to oxygen when power generation is halted, while also enabling control of the recirculation rate of the oxygen-containing gas to be carried out effectively.

The present invention relates to a fuel cell system equipped with a fuel cell that generates electric power through an electrochemical reaction between an oxygen-containing gas, which is supplied to a cathode, and a fuel gas, which is supplied to an anode, an oxygen-containing gas supply device for supplying the oxygen-containing gas to the fuel cell, and a fuel gas supply device for supplying the fuel gas to the fuel cell.

In the fuel cell system, the oxygen-containing gas supply device comprises an oxygen-containing gas supply flow passage that communicates with an oxygen-containing gas inlet of the fuel cell, an oxygen-containing gas discharge flow passage that communicates with an oxygen-containing gas outlet of the fuel cell, a compressor disposed in the oxygen-containing gas supply flow passage, a supply flow passage sealing valve disposed in the oxygen-containing gas supply flow passage at a location downstream from the compressor, a discharge flow passage sealing valve disposed in the oxygen-containing gas discharge flow passage, and a discharge fluid circulation flow passage that communicates with the oxygen-containing gas discharge flow passage at a location upstream from the discharge flow passage sealing valve, while also communicating with the oxygen-containing gas supply flow passage at a location upstream from the compressor.

Further, in the method for stopping power generation, when power generation of the fuel cell is stopped, the pressure on a side of the cathode is raised above ordinary pressure by narrowing a degree of opening of the discharge flow passage sealing valve to thereby consume all of an oxygen component.

In the present invention, the supply flow passage sealing valve is disposed in the oxygen-containing gas supply flow passage at a location downstream from the compressor. Owing thereto, the cathode side sealing region, which is sealed by the supply flow passage sealing valve and the discharge flow passage sealing valve, is narrowed. In addition, a compressor, from which air is easily leaked, is arranged outside of the cathode side sealing region, such that when power generation is stopped, inflow of oxygen into the cathode side sealing region can be suppressed. Accordingly, the fuel cell can be prevented insofar as possible from suffering from deterioration due to oxygen.

Furthermore, one end of the discharge fluid circulation flow passage communicates with the oxygen-containing gas discharge flow passage at a location upstream from the discharge flow passage sealing valve, while another end of the discharge fluid circulation flow passage communicates with the oxygen-containing gas supply flow passage at a location upstream from the compressor.

Consequently, by controlling the degree of opening of the discharge flow passage sealing valve, the circulation ratio (oxygen-containing off gas/new air), i.e., a ratio of the circulated oxygen-containing off gas (oxygen-containing gas discharged from the fuel cell) to new air that is supplied to the compressor, can be controlled. For this reason, the circulation ratio can easily be controlled corresponding to operating conditions or the like.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
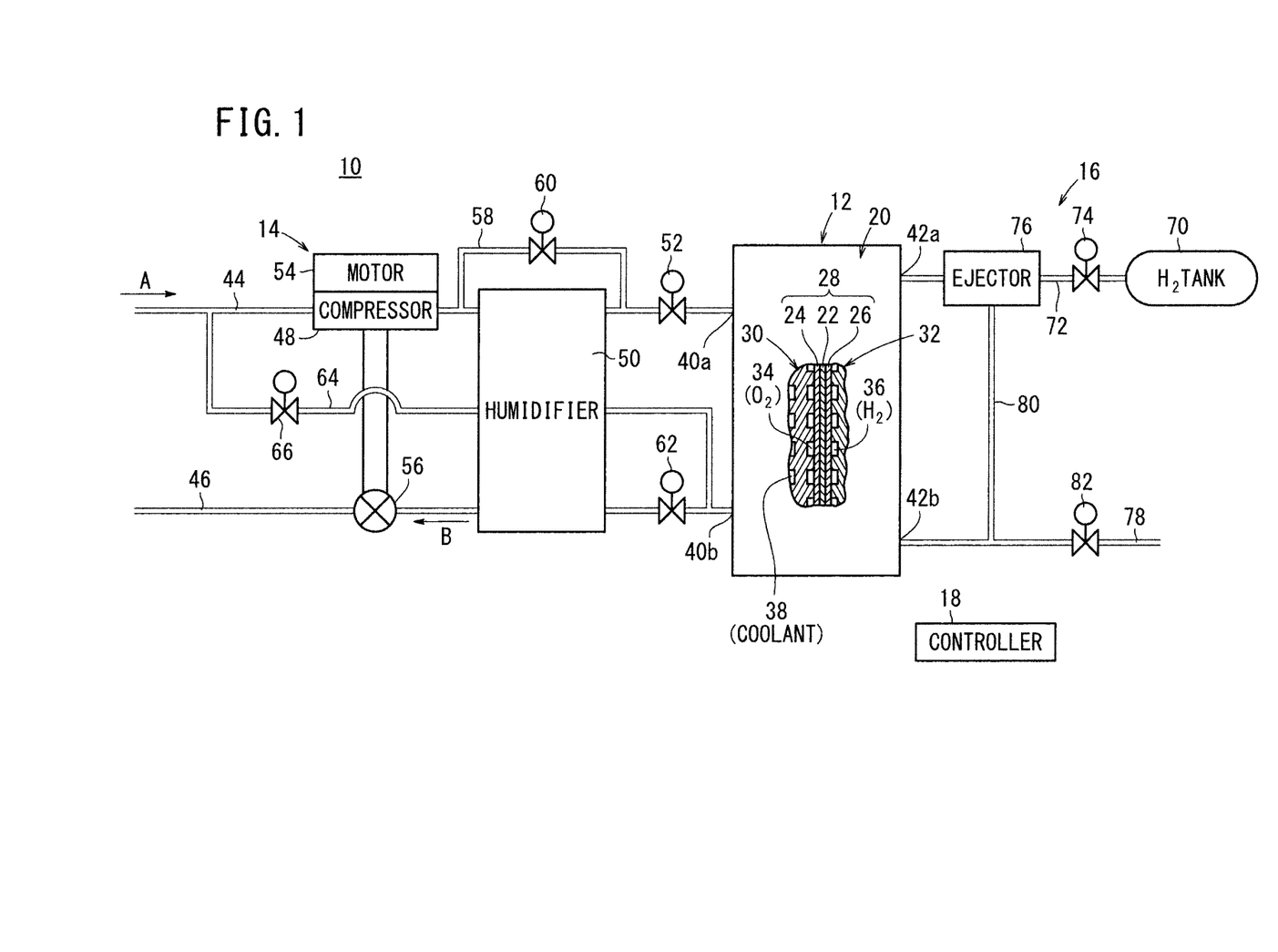
FIG. 1 is a schematic block diagram of a fuel cell system according to a first embodiment of the present invention.

As shown in FIG. 1, a fuel cell system 10 according to a first embodiment of the present invention is equipped with a fuel cell 12 that generates electric power through an electrochemical reaction between an oxygen-containing gas, which is supplied to a cathode, and a fuel gas, which is supplied to an anode, an oxygen-containing gas supply device 14 for supplying the oxygen-containing gas to the fuel cell 12, a fuel gas supply device 16 for supplying the fuel gas to the fuel cell 12, and a controller (control device) 18.

The fuel cell 12 is made up from a plurality of stacked unit cells 20. Each of the unit cells 20, for example, comprises a membrane electrode assembly (MEA) 28 including a solid polymer electrolyte membrane 22 in the form of a perfluorosulfonic acid thin membrane impregnated with water, together with a cathode 24 and an anode 26, which sandwich the solid polymer electrolyte membrane 22 therebetween.

Each of the cathode 24 and the anode 26 has a gas diffusion layer such as carbon paper, and an electrode catalyst layer formed by a platinum alloy (or Ru, etc.) supported on porous carbon particles, which are deposited uniformly on the surface of the gas diffusion layer. The electrode catalyst layers of the cathode 24 and the anode 26 are fixed to both sides of the solid polymer electrolyte membrane 22, respectively.

The membrane electrode assembly 28 is sandwiched between a cathode side separator 30 and an anode side separator 32. Each of the cathode side separator 30 and the anode side separator 32, for example, is formed by a carbon separator or a metal separator.

An oxygen-containing gas flow field 34 is provided between the cathode side separator 30 and the membrane electrode assembly 28, and a fuel gas flow field 36 is provided between the anode side separator 32 and the membrane electrode assembly 28. A coolant flow field 38 is provided between the mutually adjacent cathode side separator 30 and anode side separator 32.

The fuel cell 12 has an oxygen-containing gas inlet 40a through which an oxidant gas, e.g., an oxygen-containing gas (hereinafter also referred to as "air"), is supplied, a fuel gas inlet 42*a* through which a fuel gas, e.g., a hydrogen-containing gas (hereinafter also referred to as "hydrogen gas") is supplied, a coolant inlet passage (not shown) through which a coolant is supplied, an oxygen-containing gas outlet 40*b* through which the oxygen-containing gas is discharged, a fuel gas outlet 42*b* through which the fuel gas is discharged, and a coolant outlet (not shown) through which the coolant is discharged, each of the inlets and outlets extending in the stacking direction through the fuel cells 12.

The oxygen-containing gas supply device 14 includes an oxygen-containing gas supply flow passage 44 that communicates with the oxygen-containing gas inlet 40*a* of the fuel cell 12, and an oxygen-containing gas discharge flow passage 46 that communicates with the oxygen-containing gas outlet 40*b* of the fuel cell 12.

A compressor 48, a humidifier (moisture exchanger) 50, and a supply flow passage sealing valve 52 are arranged in this order in the oxygen-containing gas supply flow passage 44, from an upstream side to a downstream side in the flow direction (the direction of the arrow A) of air, which makes up the oxygen-containing gas.

The compressor 48 is driven by a motor 54 and is connected to an expander turbine 56, which is capable of transmitting a motive force. The expander turbine 56 is arranged in the oxygen-containing gas discharge flow passage 46.

The humidifier 50 is disposed to straddle between the oxygen-containing gas supply flow passage 44 and the oxygen-containing gas discharge flow passage 46, and carries out moisture and heat exchange between a supply gas (supplied air), which flows in the direction of the arrow A through the oxygen-containing gas supply flow passage 44, and the discharge gas (oxygen-containing off gas). A bypass passage 58, which bypasses the humidifier 50, communicates with the oxygen-containing gas supply flow passage 44. An opening/closing valve 60 is arranged in the bypass passage 58.

A discharge flow passage sealing valve 62, the humidifier 50, and the expander turbine 56 are arranged in this order in the oxygen-containing gas discharge flow passage 46 from an upstream side to a downstream side in the flow direction (the direction of the arrow B) of the discharged oxygen-containing off gas.

A discharge fluid circulation flow passage 64 is provided, one end of which communicates with the oxygen-containing gas discharge flow passage 46 at a location upstream from the discharge flow passage sealing valve 62 (i.e., in the vicinity of the oxygen-containing gas outlet 40*b*), and the other end of which communicates with the oxygen-containing gas supply flow passage 44 at a location upstream from the compressor 48. An opening/closing valve (circulation flow passage valve) 66 is arranged in the discharge fluid circulation flow passage 64. The discharge fluid circulation flow passage 64 is inserted inside the humidifier 50.

The fuel gas supply device 16 comprises a hydrogen tank (H$_2$ tank) 70 storing high pressure hydrogen therein. The hydrogen tank 70 communicates with the fuel gas inlet 42*a* of the fuel cell 12 through a hydrogen supply flow passage 72. A shutoff valve 74 and an ejector 76 are disposed in the hydrogen supply flow passage 72.

The fuel gas supply device 16 further comprises a fuel off gas flow passage 78, which communicates with the fuel gas outlet 42*b* of the fuel cell 12. A hydrogen circulation passage 80 that communicates with the ejector 76, and a shutoff valve (purge valve) 82 are disposed in the fuel off gas flow passage 78.

Operations of the fuel cell system 10 shall be explained below.

First, air is delivered to the oxygen-containing gas supply flow passage 44 through the compressor 48 of the oxygen-containing gas supply device 14. After air has passed through the humidifier 50 and has been humidified, the air is supplied to the oxygen-containing gas inlet 40*a* of the fuel cell 12. The air is supplied to the cathode 24 by moving along the oxygen-containing gas flow field 34 provided in each of the unit cells 20 inside the fuel cell 12.

The oxygen-containing off gas, which contains non-reacted air, is discharged from the oxygen-containing gas outlet 40*b* into the oxygen-containing gas discharge flow passage 46, and is delivered to the humidifier 50 to humidify air which is newly supplied. The oxygen-containing off gas, after having been supplied as a drive source to the expander turbine 56, is discharged to the exterior. The expander turbine 56 is capable of transmitting motive power to the compressor 48.

On the other hand, in the fuel gas supply device 16, by opening the shutoff valve 74, hydrogen gas that flows out from the hydrogen tank 70 is supplied to the hydrogen supply flow passage 72. The hydrogen gas is supplied to the fuel gas inlet 42*a* of the fuel cell 12 through the hydrogen supply flow passage 72. Hydrogen gas, which is supplied to the interior of the fuel cell 12, is supplied to the anode 26 by moving along the fuel gas flow field 36 of each of the unit cells 20. Accordingly, the air supplied to the cathode 24 and the hydrogen gas supplied to the anode 26 react electrochemically, thereby generating electric power.

Hydrogen off gas, which is discharged from the fuel gas flow field 36, is drawn into the ejector 76 from the fuel gas outlet 42*b* through the hydrogen circulation passage 80, and is supplied again to the fuel cell 12 as a fuel gas.

The discharge fluid circulation flow passage 64, which provides communication between the oxygen-containing gas supply flow passage 44 and the oxygen-containing gas discharge flow passage 46, is disposed in the oxygen-containing gas supply device 14. Owing thereto, when the opening/closing valve 66 provided in the discharge fluid circulation flow passage 64 is opened, the oxygen-containing off gas, which is directed into the oxygen-containing gas discharge flow passage 46 from the oxygen-containing gas outlet 40*b* of the fuel cell 12, is introduced through the discharge fluid circulation flow passage 64 into the oxygen-containing gas supply flow passage 44.

Consequently, the oxygen-containing off gas is mixed together with the newly supplied air in the oxygen-containing gas supply flow passage 44 and is drawn into the compressor 48. The mixed oxygen-containing gas is supplied to the oxygen-containing gas inlet 40*a* of the fuel cell 12 through the humidifier 50, or alternatively, through the bypass passage 58, under an opening action of the opening/closing valve 60.

In this case, according to the first embodiment, the supply flow passage sealing valve 52 is disposed in the oxygen-containing gas supply flow passage 44 at a location downstream from the compressor 48. Owing thereto, the cathode side sealing region, which is sealed by the supply flow passage sealing valve 52 and the discharge flow passage sealing valve 62, is narrowed effectively.

In addition, the compressor 48, from which air is easily leaked, is arranged outside of the cathode side sealing region, such that when power generation is stopped, inflow of oxygen into the cathode side sealing region can be suppressed. Accordingly, the fuel cell 12 can be prevented insofar as possible from suffering from deterioration due to ingression of unnecessary oxygen.

Furthermore, one end of the discharge fluid circulation flow passage 64 communicates with the oxygen-containing gas discharge flow passage 46 at a location upstream from the discharge flow passage sealing valve 62, while another end of the discharge fluid circulation flow passage 64 communicates with the oxygen-containing gas supply flow passage 44 at a location upstream from the compressor 48. Consequently, merely by adjusting the degree of opening of the discharge flow passage sealing valve 62, the flow rate of the oxygen-containing off gas supplied to the discharge fluid circulation flow passage 64 can be adjusted appropriately.

Accordingly, if the discharge flow passage sealing valve 62 is opened fully, a required amount of energy recovery by the expander turbine 56, which functions as a regenerative unit, can be suitably assured, whereas by setting the discharge flow passage sealing valve 62 to a minute opening degree, an extremely small amount of oxygen-containing off gas can be circulated with respect to the discharge fluid circulation flow passage 64.

In particular, the discharge flow passage sealing valve 62 is capable of adjusting the degree of opening at least between a fully open state and a minutely open state. The minutely open state is defined as an open state that can adjust the flow rate of the oxygen-containing off gas circulated in the discharge fluid circulation flow passage 64, thereby raising the cathode side pressure above ordinary pressure, and further, which can maintain a necessary flow rate for consuming all of the oxygen component including the air that is newly drawn into the compressor 48.

For this reason, at the cathode side of the fuel cell system 10, the oxygen component is consumed whereas the nitrogen component remains, whereby the cathode side is filled with the remaining nitrogen component (nitrogen enrichment), and the pressure of the nitrogen component is regulated to be greater than atmospheric pressure, i.e., is set to a pressure that prevents outside air from being introduced to the cathode side of the fuel cell system 10.

Consequently, according to the first embodiment, by controlling the degree of opening of the discharge flow passage sealing valve 62, the circulation ratio (oxygen-containing off gas/new air), i.e., a ratio of the circulated oxygen-containing off gas to new air that is supplied to the compressor 48, can be controlled. Accordingly, the recirculation ratio can easily and reliably be controlled corresponding to operating conditions or the like.

Figure 2:
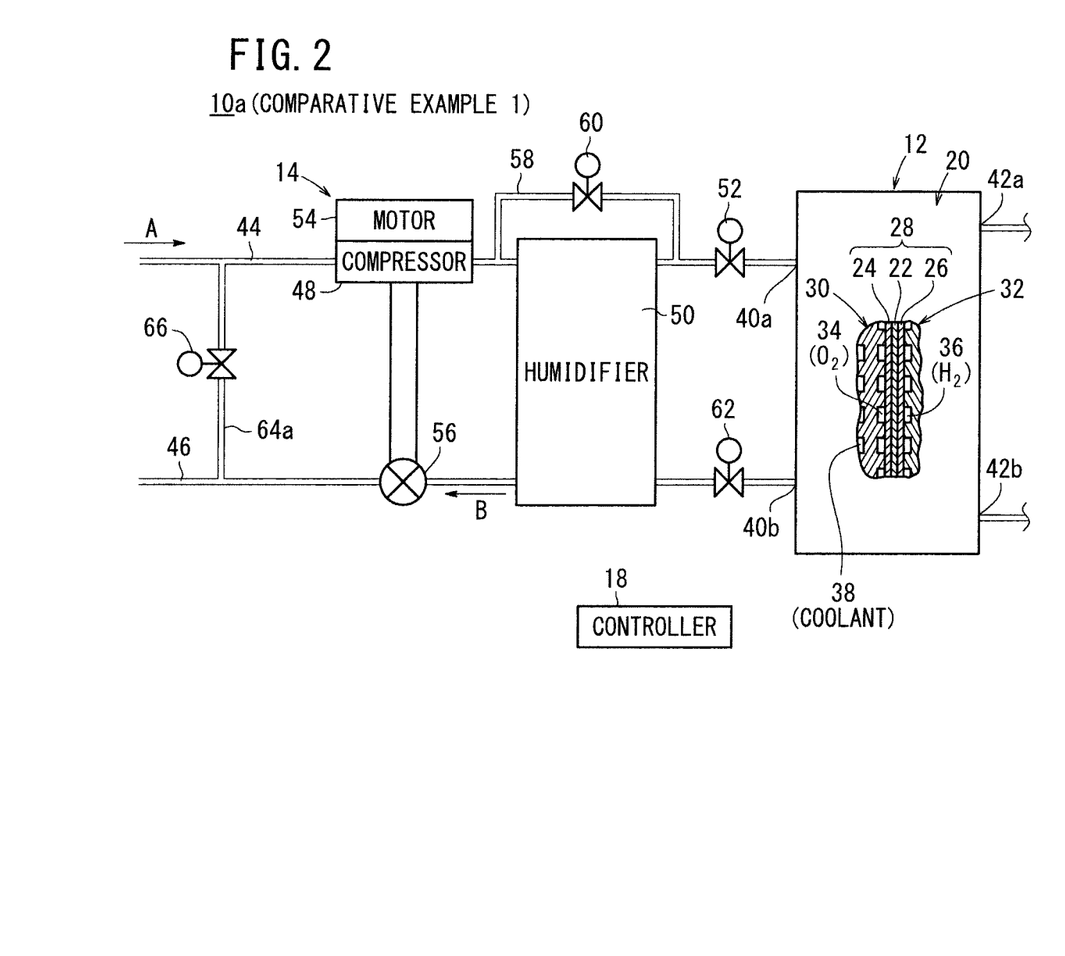
FIG. 2 is a schematic block diagram of a fuel cell system according to a first comparative example.
Figure 3:
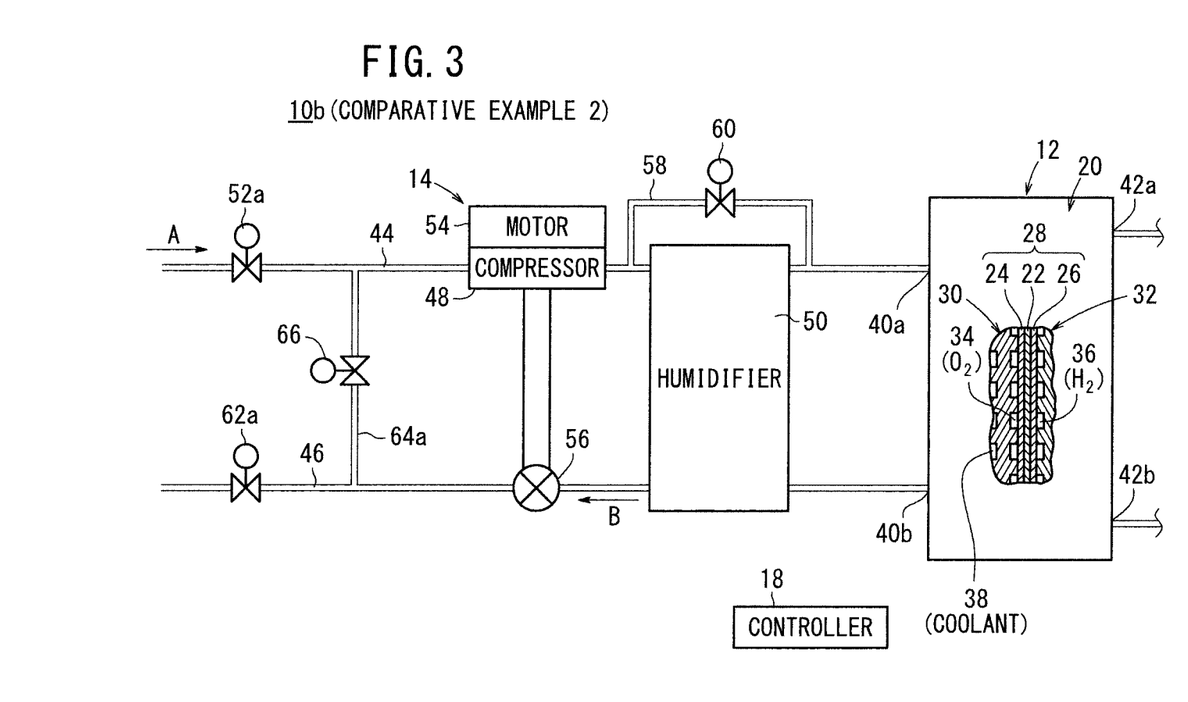
FIG. 3 is a schematic block diagram of a fuel cell system according to a second comparative example.

In FIG. 2, a typically considered fuel cell system 10*a* is shown, and in FIG. 3, similarly, another typically considered fuel cell system 10*b* is shown. Constituent components thereof, which are the same as those of the fuel cell system 10 according to the first embodiment, are designated with the same reference characters, and detailed descriptions of such features are omitted.

As shown in FIG. 2, the fuel cell system 10*a* comprises an oxygen-containing gas supply flow passage 44, an oxygen-containing gas discharge flow passage 46, and a discharge fluid circulation flow passage 64*a*. One end of the discharge fluid circulation flow passage 64*a* communicates with the oxygen-containing gas supply flow passage 44 at a location upstream from the compressor 48, and another end of the discharge fluid circulation flow passage 64*a* communicates with the oxygen-containing gas discharge flow passage 46 at a location downstream from the expander turbine 56.

In the fuel cell system 10*a*, due to the presence of the supply flow passage sealing valve 52 and the discharge flow passage sealing valve 62, the cathode side sealing region can be narrowed, and the oxygen-containing off gas can be circulated.

However, while the cathode side sealing region is sealed, it is difficult for the interior of the cathode side sealing region to be filled with nitrogen. Further, because the discharge fluid circulation flow passage 64*a* is connected to the oxygen-containing gas discharge flow passage 46 at a location downstream from the expander turbine 56, this makes it difficult to control output for raising the internal pressure at an extremely small flow rate.

Further, as shown in FIG. 3, according to the fuel cell system 10*b*, a supply flow passage sealing valve 52*a* is arranged in the oxygen-containing gas supply flow passage 44 at a location upstream from the compressor 48, whereas a discharge flow passage sealing valve 62*a* is arranged in the oxygen-containing gas discharge flow passage 46 at a location downstream from the expander turbine 56. Further, a discharge fluid circulation flow passage 64*a* is provided, similar to the fuel cell system 10*a*.

With the fuel cell system 10*b*, the cathode side sealing region, which is sealed by the supply flow passage sealing valve 52*a* and the discharge flow passage sealing valve 62*a*, is enlarged considerably, and additionally the compressor 48, the airtightness of which is low, is disposed inside the cathode side sealing region. Consequently, it is difficult to secure an adequate degree of airtightness.

In contrast thereto, according to the first embodiment, upon stopping power generation, by controlling the discharge flow passage sealing valve 62 to a minutely small degree of opening, and by continuing to generate electric power while a minute flow amount of the oxygen-containing off gas is made to flow through the discharge fluid circulation flow passage 64, the oxygen on the cathode side of the fuel cell 12 is consumed completely and uniformly, and the side of the cathode can be filled with nitrogen.

Figure 4:
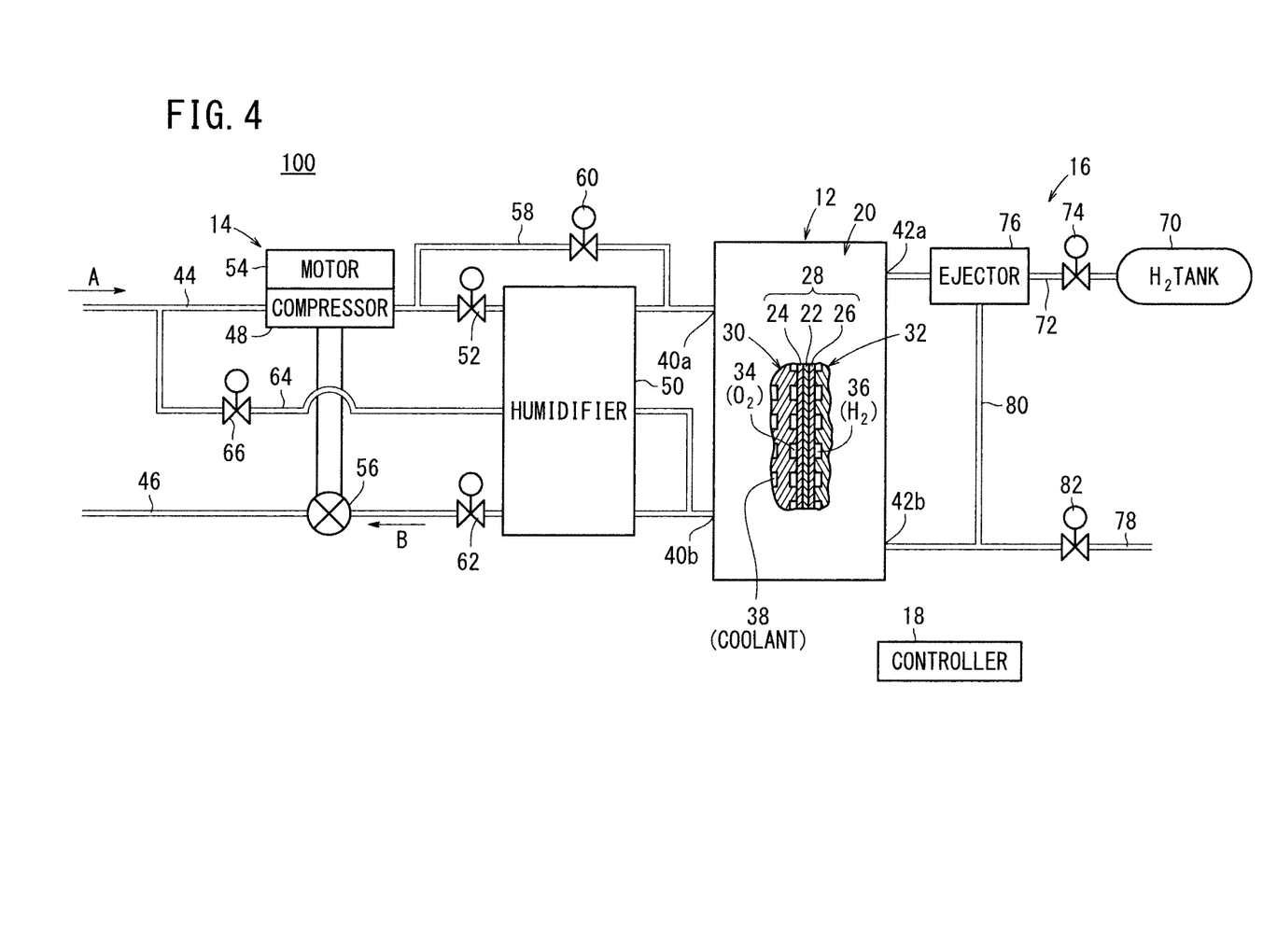
FIG. 4 is a schematic block diagram of a fuel cell system according to a second embodiment of the present invention.

FIG. 4 is a schematic block diagram of a fuel cell system 100 according to a second embodiment of the present invention. Constituent elements thereof, which are the same as those of the fuel cell system 10 according to the first embodiment, are designated with the same reference characters, and detailed descriptions of such features are omitted. The same applies to the description of the third embodiment.

With the fuel cell system 100, the supply flow passage sealing valve 52 is disposed in the oxygen-containing gas supply flow passage 44 at a location upstream from the humidifier 50, whereas the discharge flow passage sealing valve 62 is disposed in the oxygen-containing gas discharge flow passage 46 at a location downstream from the humidifier 50.

According to the second embodiment, the supply flow passage sealing valve 52 is arranged in the vicinity of an inlet side of the humidifier 50, and is exposed to dry air that flows along the oxygen-containing gas supply flow passage 44. On the other hand, the discharge flow passage sealing valve 62 is arranged on the outlet side of the humidifier 50. Therefore, the oxygen-containing off gas, from which moisture has been removed by the humidifier 50, flows through the discharge flow passage sealing valve 62. Accordingly, the supply flow passage sealing valve 52 and the discharge flow passage sealing valve 62 are exposed to low humidity gas, and adverse effects caused by moisture can advantageously be avoided.

It should also be noted, in FIG. 4, if the discharge flow passage sealing valve 62 were arranged upstream from the humidifier 50, there is a concern that cross leakage of the oxygen-containing gas could occur at the interior of the humidifier 50, for example, due to membrane characteristics of the humidifier 50.

Figure 5:
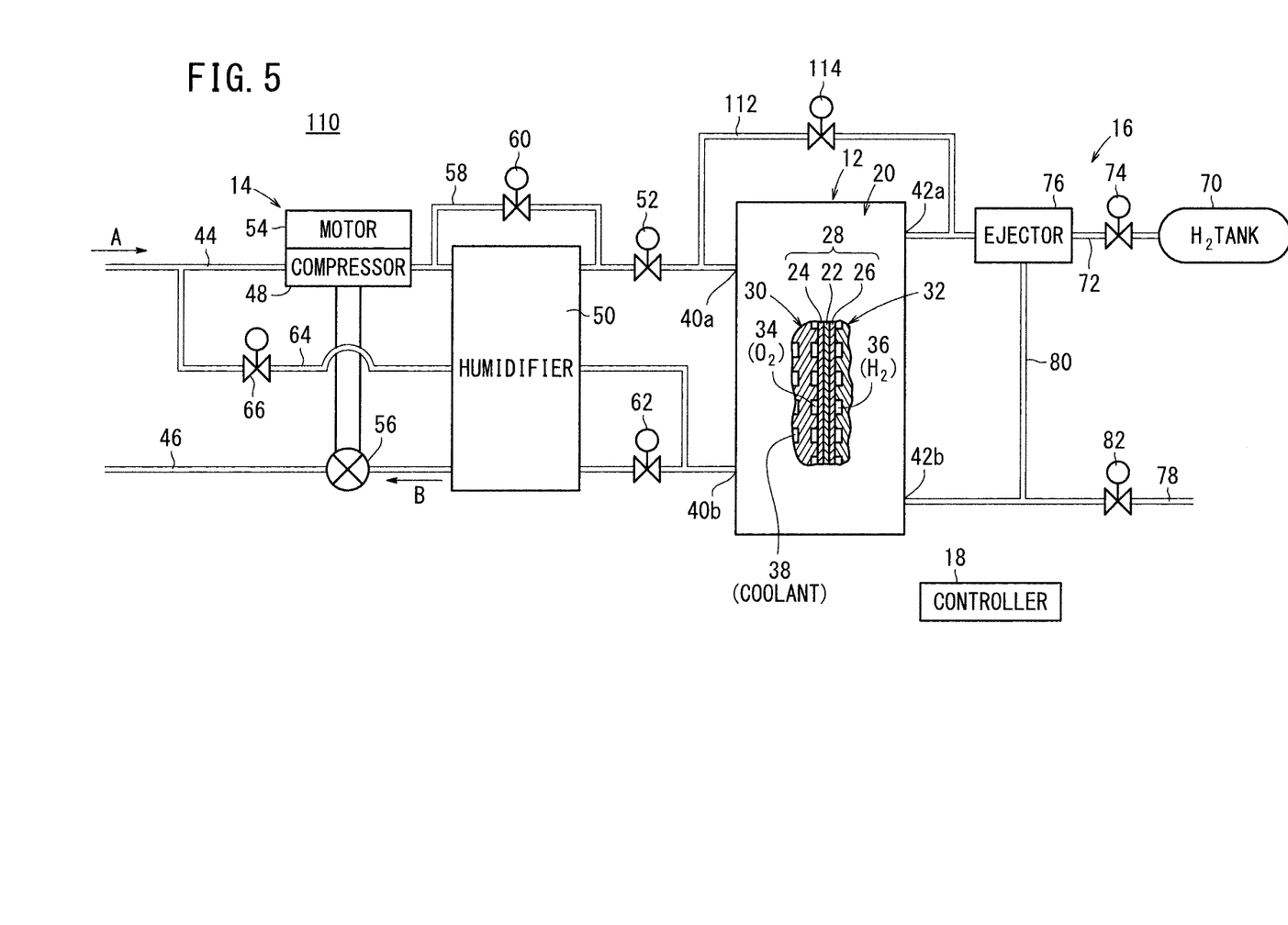
FIG. 5 is a schematic block diagram of a fuel cell system according to a third embodiment of the present invention.

FIG. 5 is a schematic block diagram of a fuel cell system 110 according to a third embodiment of the present invention.

In the fuel cell system 110, one end of a branch passage 112 communicates with the oxygen-containing gas supply flow passage 44 at a location downstream from the supply flow passage sealing valve 52, and another end of the branch passage 112 communicates with the hydrogen supply flow passage 72 that makes up the fuel gas supply device 16. An opening/closing valve 114 is arranged in the branch passage 112.

With the third embodiment, upon stopping power generation of the fuel cell 12, similar to the aforementioned first embodiment, after the cathode side sealing region has been filled with the nitrogen component, the opening/closing valve 114 is opened, whereby the nitrogen component is delivered to the hydrogen supply flow passage 72 via the branch passage 112.

At the fuel gas supply device 16, the shutoff valves 74, 82 are closed, whereby the anode side sealing region is sealed, and the anode side sealing region is filled with the nitrogen component. Consequently, in the fuel cell 12, during the period in which power generation is stopped, both the cathode side and the anode side are filled with nitrogen, so that defects such as membrane degradation can be avoided to the greatest extent possible.

Although certain preferred embodiments of the present invention have been shown and described in detail, it should be understood that various changes and modifications may be made to the embodiments without departing from the scope of the invention as set forth in the appended claims.

What is claimed is:

1. A fuel cell system comprising:
    a fuel cell that generates electric power through an electrochemical reaction between an oxygen-containing gas, which is supplied to a cathode, and a fuel gas, which is supplied to an anode;
    an oxygen-containing gas supply device for supplying the oxygen-containing gas to the fuel cell; and
    a fuel gas supply device for supplying the fuel gas to the fuel cell,
    wherein the oxygen-containing gas supply device comprises:
    an oxygen-containing gas supply flow passage that communicates with an oxygen-containing gas inlet of the fuel cell;
    an oxygen-containing gas discharge flow passage that communicates with an oxygen-containing gas outlet of the fuel cell;
    a compressor disposed in the oxygen-containing gas supply flow passage;
    a supply flow passage sealing valve disposed in the oxygen-containing gas supply flow passage at a location downstream from the compressor;
    a discharge flow passage sealing valve disposed in the oxygen-containing gas discharge flow passage; and
    a discharge fluid circulation flow passage connected to the oxygen-containing gas discharge flow passage at a location upstream from the discharge flow passage sealing valve, while also connecting to the oxygen-containing gas supply flow passage at a location upstream from the compressor,
    wherein the discharge fluid circulation flow passage is configured to allow the oxygen-containing gas to flow from the oxygen-containing gas discharge flow passage to the oxygen-containing gas supply flow passage.

2. The fuel cell system according to claim 1, wherein a circulation flow passage valve is disposed in the discharge fluid circulation flow passage.

3. The fuel cell system according to claim 1, wherein a humidifier is arranged to straddle between the oxygen-containing gas supply flow passage and the oxygen-containing gas discharge flow passage.

4. The fuel cell system according to claim 3, wherein the supply flow passage sealing valve is disposed in the oxygen-containing gas supply flow passage at a location upstream from the humidifier, whereas the discharge flow passage sealing valve is disposed in the oxygen-containing gas discharge flow passage at a location downstream from the humidifier.

5. The fuel cell system according to claim 1, wherein the discharge flow passage sealing valve is capable of adjusting a degree of opening at least between a completely open state, and a minutely open state for maintaining a required flow rate to thereby raise the pressure on a side of the cathode above ordinary pressure and to thereby consume all of an oxygen component, and
    further comprising:
    a circulation flow passage valve disposed in the discharge fluid circulation flow passage; and
    a control device for controlling the discharge flow passage sealing valve to be placed in the minutely open state when the circulation flow passage valve is opened.

6. The fuel cell system according to claim 1, wherein the fuel gas supply device comprises a fuel gas supply flow passage that communicates with a fuel gas inlet of the fuel cell; and
    one end of a branch passage communicates with the oxygen-containing gas supply flow passage at a location downstream from the supply flow passage sealing valve, and another end of the branch passage communicates with the fuel gas supply flow passage.

7. The fuel cell system according to claim 1, wherein an expander turbine is disposed in the oxygen-containing gas discharge flow passage at a location downstream from the discharge flow passage sealing valve; and
    the expander turbine is connected to and is capable of transmitting power to the compressor.

* * * * *